(12) United States Patent
Coulthard

(10) Patent No.: US 7,154,505 B2
(45) Date of Patent: Dec. 26, 2006

(54) METHOD OF AND APPARATUS FOR GENERATING A REPRESENTATION OF AN OBJECT

(75) Inventor: Martin A. Coulthard, Bristol (GB)

(73) Assignee: Stonecube Limited, Bristol (GB)

( * ) Notice: Subject to any disclaimer, the term of this patent is extended or adjusted under 35 U.S.C. 154(b) by 107 days.

(21) Appl. No.: 10/985,390

(22) Filed: Nov. 11, 2004

(65) Prior Publication Data

US 2006/0098023 A1    May 11, 2006

(51) Int. Cl.
*G09G 5/00* (2006.01)
(52) U.S. Cl. .................... 345/581; 715/527
(58) Field of Classification Search .............. None
See application file for complete search history.

(56) References Cited

U.S. PATENT DOCUMENTS 6,768,486 B1 * 7/2004 Szabo et al. ............... 345/420

OTHER PUBLICATIONS

Pellacini, "Toward a Psychophysically-Based Light Reflection Model for Image Synthesis", 2000, ACM Press, 27th Annual conference on Computer graphics and interactive techniques, pp. 55-64.*

* cited by examiner

*Primary Examiner*—Mark Zimmerman
*Assistant Examiner*—Kevin Xu
(74) *Attorney, Agent, or Firm*—Wolf, Greenfield & Sacks, P.C.

(57) ABSTRACT

A computer implemented method for examining the appearance of a printed object within a virtual environment is provided. A graphic designer or other user defines the shape and substrate of the object and the sequence and spatial extent of surface processing operations that are to be applied to the object. The method models the result of applying each surface processing operation in sequence.

15 Claims, 10 Drawing Sheets

METHOD OF AND APPARATUS FOR GENERATING A REPRESENTATION OF AN OBJECT

FIELD OF THE INVENTION

The present invention relates to the computer aided design and visualization of the surface of an object, and in particular to an object which has been subject to a series of surface processing operations, such as printing, coating or decoration, which effect the surface appearance of the object.

BACKGROUND OF THE INVENTION

Several computer related products now exist for the design of objects, and which also enable the appearance of the object to be visualized.

Existing 2-dimensional graphic design software includes "Freehand" and "Illustrator" which are drawing packages, "QuarkXpress" and "InDesign" which facilitate page layout and "PaintShop Pro" and "Adobe Photoshop" which are image editors. These products all allow creation of two dimensional images and the modification of those images. They also allow for patterns, shapes, text, colors and graphic objects to be modified and displayed on a flat surface. However in general these packages only model color, and not other surface appearance properties of a printed object such as gloss, haze or relief.

3D modeling packages such as "3D Studio Max" and "Maya" are also known which provide for substantial power in the modeling and visualization of 3 dimensional objects. These products generally require expert users and are typically not aimed at graphic designers and printers.

None of the prior art software treats the creation of a surface finish on a substrate as the superposition of a series of printing, coating, decoration or other surface processing operations (henceforth together referred to as "operations" for brevity) that are routinely applied, or can be applied, in commercial printing or in other surface processing.

SUMMARY OF THE INVENTION

According to a first aspect of the present invention there is provided a computer implemented method of generating a representation of an object where a surface of the object is, at least in part, subjected to at least one surface processing operation, the method comprising the steps of:
 a) an input step of receiving as an input a sequence of at least surface processing operation element, where each surface processing operation element models a corresponding physical surface processing operation;
 b) retrieving data defining the effects of each surface processing operation on the appearance characteristics of a computer model surface such that the effects mimic the real-world effects of the corresponding physical surface processing operation on the appearance of a physical surface;
 c) modeling the result of applying the surface processing operation elements in sequence to part or all of a computer model surface; and
 d) outputting a result of the modeling to produce a visual representation of the modeled object.

It is thus possible to provide a computer aided design and visualization software package which models the real world operations that can be applied to a substrate such that the end result is a realistic representation of the actual result which would be achieved by applying those operations in the real world. It is thus possible to give graphic designers the power to visualize the end result of their work prior to committing it to printing or production.

Advantageously the graphic designer can select operations so as to build a print process consisting of a sequence of operations, which may be applied to either the whole or selected parts of the surface of a model of an object that has been defined within the computer.

The graphic designer may import and position various graphic images to act as operation coverage images which control the application of the operations on one or more surfaces of an object that has been defined within the computer. It thus becomes possible to define those portions of the surface which may, for example, be printed using a conventional process such as a process color print operation whilst other portions of the surface may be subject to other operations such as spot color printing, embossing, foil blocking (i.e. a thin film of metal is applied to the surface) or varnishing and so on.

Preferably the surface processing operations are applied in the order defined in an operation stack which represents the sequence of surface processing operations that are applied. This ensures that, where the order in which operations are performed causes a difference to the final appearance of the object, the actual appearance of an object printed in accordance with those operations in that order will be accurately represented by the model.

Advantageously the user can select an environment in which to view the model of the object. The environments, may, for example, include representations of a shop, an office and a room within a house. This list is not exhaustive. Each environment has its own lighting conditions which illuminate the model. Thus, in an extreme example, if a model had a metal foil block finish on part of its surface, then this would be able to reflect parts of the environment towards the viewer. The creation and use of these environments allows the designer to simulate how the object being modeled will look in selected environments representative of real world conditions. This will help demonstrate when certain finishing techniques or contrasting features do or do not give the desired effect.

According to a second aspect of the present invention there is provided a computer program product for causing a computer to implement a method according to a first aspect of the present invention.

According to a third aspect of the present invention there is provided a user interface for use with a computer adapted to generate a representation of a model of an object where a surface of the object is, at least in part, subjected to at least one surface processing operation, the user interface comprising an input portion arranged to present the user with at least one item from a list comprising:
 a) an option to choose the shape of the model and set its dimensions;
 b) an option to select from a list the substrate material for the model and adjust its characteristics;
 c) an option to select a face or faces of the model or define a region to which a surface processing operation is to be applied;
 d) an option to add a surface processing operation by selecting from a list of surface processing operation types;
 e) an option to import and position a graphic image to act as a coverage image for a surface processing operation;
 f) an option to vary the color and other control parameters of a surface processing operation;

g) an option to repeat steps d) to f) to add and modify further surface processing operations; and h) an option to change the order in which the surface processing operations are applied to the object.

It is thus possible to provide a user interface which enables a relatively inexperienced user to select operations that will be applied to chosen areas on a substrate, and to view the effect of a applying these operations in a specified order to the substrate.

Advantageously the user interface further comprises an output portion such that a 3D view of the model of the object is rendered within a selected environment and is displayed to the user so that the user can assess the aesthetic qualities of the object.

Advantageously the user can alter the position of the model within the environment surrounding the model so that the user can simulate, for example, the effect of rotating the model or moving a viewpoint within the environment. The user may also be able to zoom into or away from the model, move the model or viewpoint sideways relative to each other (pan and scroll) and/or view the model in a different environment.

BRIEF DESCRIPTION OF THE DRAWINGS

The present invention will further be described, by way of example, with reference to the accompanying figures in which.

DESCRIPTION OF PREFERRED EMBODIMENTS

Figure 1:
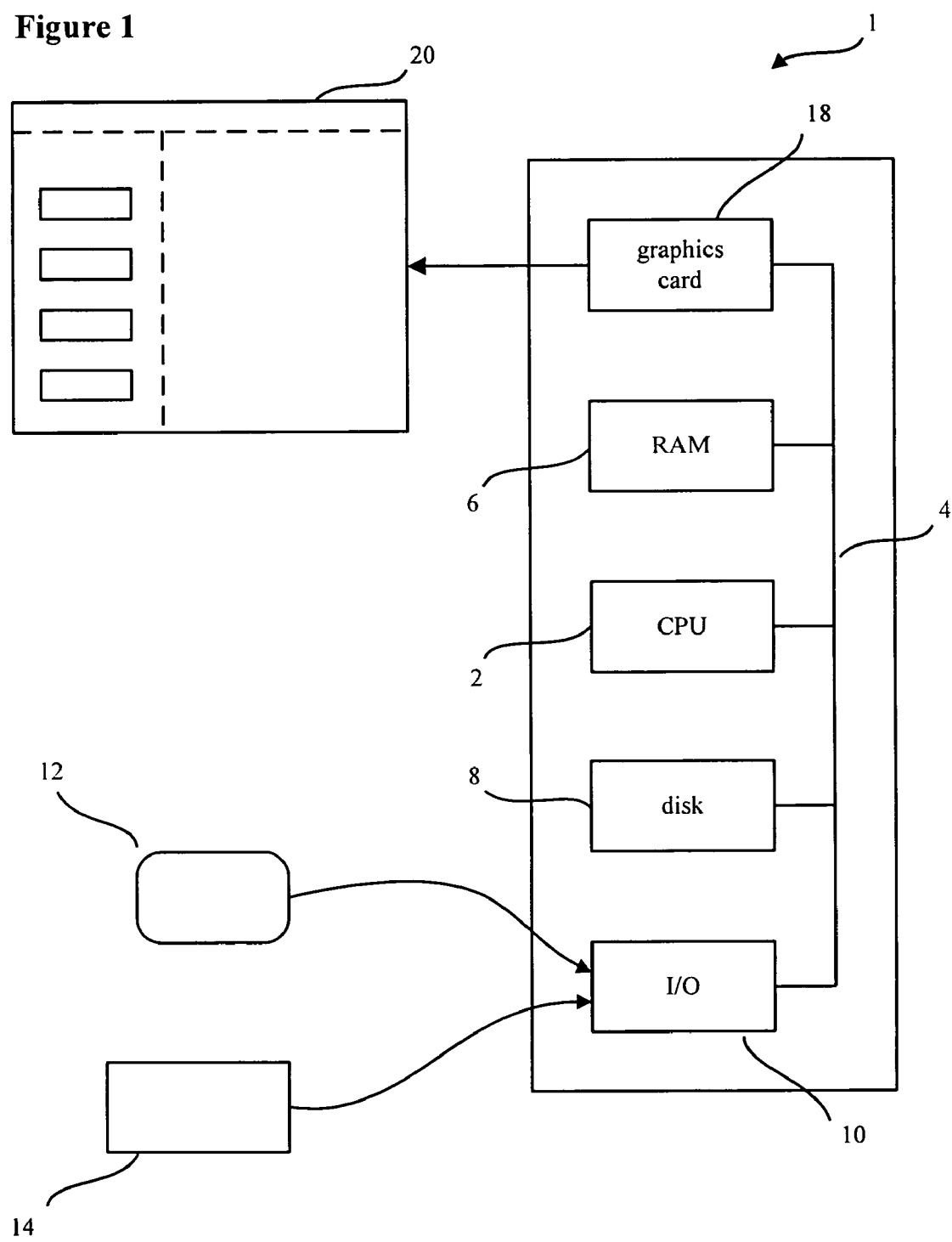
FIG. 1 is a schematic diagram of a programmable computer suitable for carrying out the method of the present invention.

FIG. 1 schematically illustrates a computer system, generally indicated 1, suitable for performing the present invention. The computer comprises a central processing unit 2 which is connected via a bus 4 to semiconductor random access memory 6, a hard disk 8 (and its associated controller), an input/output controller 10 which is in turn connected to user input devices such as a mouse 12 and a keyboard 14. The central processing unit is also connected via the bus 4 to a graphics card 18 which in turn drives a display device 20 which typically will be of a well known display technology such as an liquid crystal display or a cathode ray tube display. The computer 1 may also have connections to a local area network and also to a scanner or a camera for the input of graphic images. For the purposes of the description, it will be assumed that this functionality is provided within the input output controller 10.

The disc 8 provides bulk store of software, such as the computer operating system and applications, including a computer aided design application constituting an embodiment of the present invention.

Figure 2:
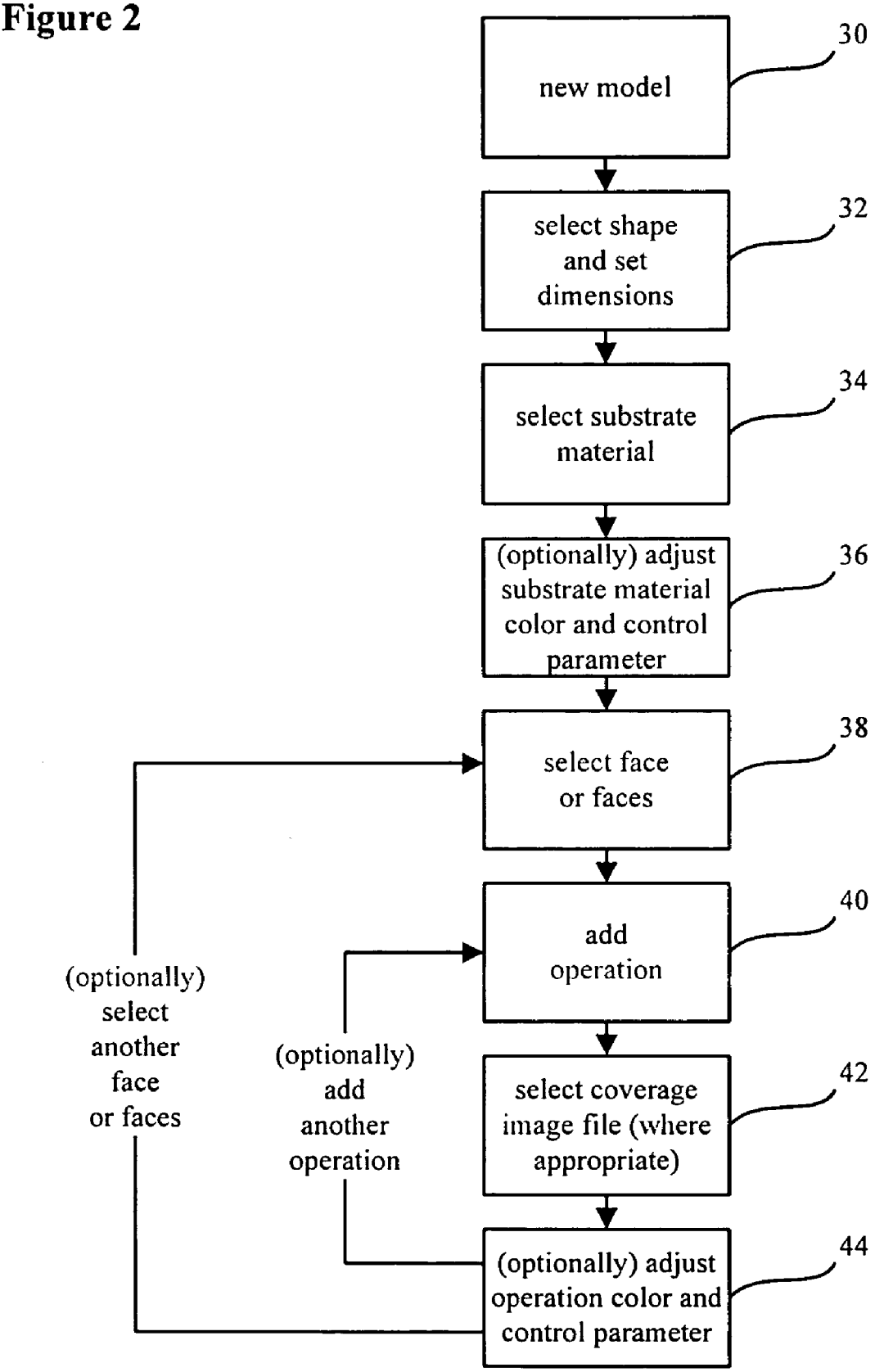
FIG. 2 schematically illustrates steps performed by an embodiment of the present invention.

FIG. 2 schematically illustrates the processing steps of the present invention.

The process begins at step 30 where a new model is created. A new blank model has default initial shape, size and surface finishes. Typically it is a white, matt cuboid-shaped object with a square front face.

At step 32 the user may define the shape and dimensions of the model. The user may be provided with the option to define their own model shape, but more typically they will be presented with a library of predefined shapes from which they may select the appropriate object. In an embodiment of the invention the options are presented on a drop down list of the type which is frequently used in graphical user interface. This is possible because the present invention is primarily intended to be used by well defined design groups, such as graphic designers and ceramic tile designers, and in general these groups design objects that have well defined geometrical shapes. Thus graphic designers typically work with paper of predetermined paper sizes, such as A4, letter, or the common business card size. They may also work with standard product shapes such as a CD case or a DVD case. Typically the object under consideration will have planar surfaces. Although this is not a mandatory feature, other geometric shapes, such as those found for drink cans and bottles may also be pre-programmed as visual appearance of the packaging of these products is known to be important to the purchasing decision.

Once the user has selected the shape and size of the object that they wish to model, control passes from step 32 to step 34 where the user selects the substrate material for the object from a list of substrates presented by the user interface. Thus a graphic designer designing a book may well be working with a paper or stiff card surface. However within that broad category of surface the paper or card will exhibit various properties, such as surface texture, and whether it is a matt or gloss paper. Generally any reliably produced commercial product that is to be used as a substrate will have repeatable properties and consequently these can be modeled and the product can be identified to the designer by a commercial trade name or a generic description, whichever is most appropriate. The designer is not restricted to working with paper and may for example work with a plastic substrate or even a metal substrate, as might be suitable when designing the finish for a drinks can. At this stage the user can optionally adjust the color and other characteristics of the substrate.

At step 36 the user may optionally adjust the color of the substrate or other surface properties or parameters, such as the depth of the surface texture.

In step 38 the user selects the face or faces to which one or more surface processing operations are to be applied. A user may choose to design the surfaces in unison, or to design one or more surfaces at a time. The former option may typically be chosen where a graphic image is spread over two or more surfaces such as might be the case for the front, spine and back cover of a book. However for other items it may be expected that the designer will design each surface separately.

Having chosen a particular face or faces at step 38 control passes to step 40 where the user adds a surface processing operation by choosing from a list of available operation types.

Having selected the operation type the user is typically, at step 42, prompted to choose a coverage image file to control where the operation is to be applied to the selected face or faces. The coverage image has an effect on the application similar to a screen in silk-screen printing in that it controls both the location and degree or amount of application of that operation. Coverage images are graphic images and may be of a variety of standard and proprietary image file types. Coverage images, which will typically be pictures, lettering or logos, may be positioned over the face which is currently under design.

After selecting the coverage image for a operation the user may then at step 44 adjust the color and a control parameter for the operation. The nature of the control parameter(s) that can be changed are dependent on the operation type chosen, but might, for example, include the ink opacity for a spot color print operation, or the depth of the deboss for a foil block operation.

Having completed the addition and adjustment of the first operation the user typically then returns to step 40 and adds further operations until the intended sequence of operations, represented in the operation stack, is complete.

When the operation stack for the first selected face or faces is complete the user may return to step 38, select a different face or faces and then build up further operation stack for that face or faces, in the same manner as for the first face or faces.

Generally, a user can switch, at will, between any of the preceding steps at any time during the use of the software.

Typically the user is presented with a display of a sequence of operations as an operation stack which represents the complete printing or decoration process for the currently selected face or faces. The user can select a current operation, for example by clicking on it with a mouse to highlight it via a graphical user interface. Having selected an operation as the current operation, the user can then use the user interface to access and modify certain characteristics of the operation, such as the coverage image (as in step 42) and the color and control parameter (as in step 44). The user can also promote or demote the current operation in the operation stack, either one step at a time by selecting the appropriate "up" or "down" icon, or by cutting the processing step out of the list and inserting a new insertion point for it into the list.

Before outputting a view of the object, for example by rendering a view of the object with a 3-D rendering engine, it is necessary to transform each operation stack into a render stack. Preferably this transformation is carried out by the data processor 1 each time that a new model is created, or when a stored model is loaded from the hard disc, or when a model that has already been loaded has any aspect of an operation stack is modified.

Figure 3:
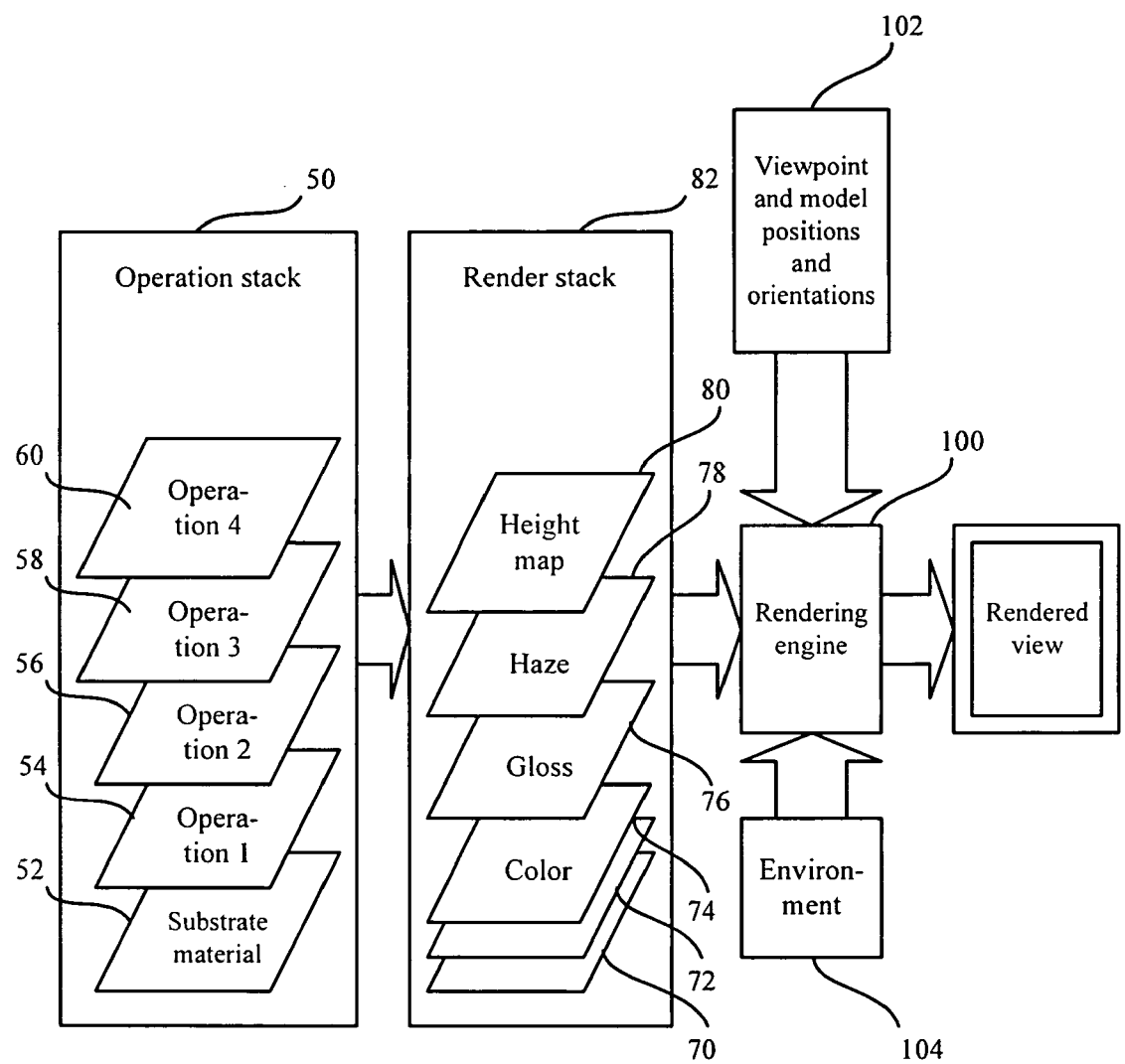
FIG. 3 schematically illustrates the interrelation between an operation stack and a render stack for the generation of images for rendering.

An operation stack 50 maintains a list of the operations which are to be applied to the face or faces of the model. In this context each operation can be thought of as applying a different physical step in a printing or surface processing process. The operation stack shown in FIG. 3 maintains a description of the substrate material, whose properties are schematically represented at 52, together with a subsequent list of operations, operations 1 to 4 denoted 54, 56, 58 and 60 respectively. Each operation 54 to 60 can generally be defined in terms of its coverage image (if any) and its effect on the color, gloss, haze and surface height of the surface it is applied to.

The render stack contains the surface appearance data in a form that can readily be used by the rendering engine, running mainly on the graphics card 18, to generate realistic 3D views of the model. In a preferred embodiment the surface appearance data consists of the color (represented by red 70, green 72 and blue 74 values), gloss 76, haze 78 and surface height 80. In this context gloss is considered to be the proportion of incident light specularly reflected by the surface (i.e. specular reflectivity) and haze is the degree of spread of a specularly reflected incident light ray.

The values of the red, green and blue colors, gloss, haze and height for each point on the face are held in image tables 70, 72, 74, 76, 78 and 80 of a render stack 82. The render stack is the result of successfully working through calculation of the properties of the base material and then the effects of applying operations 1 to 4, in sequence, from the operations stack.

Figure 4:
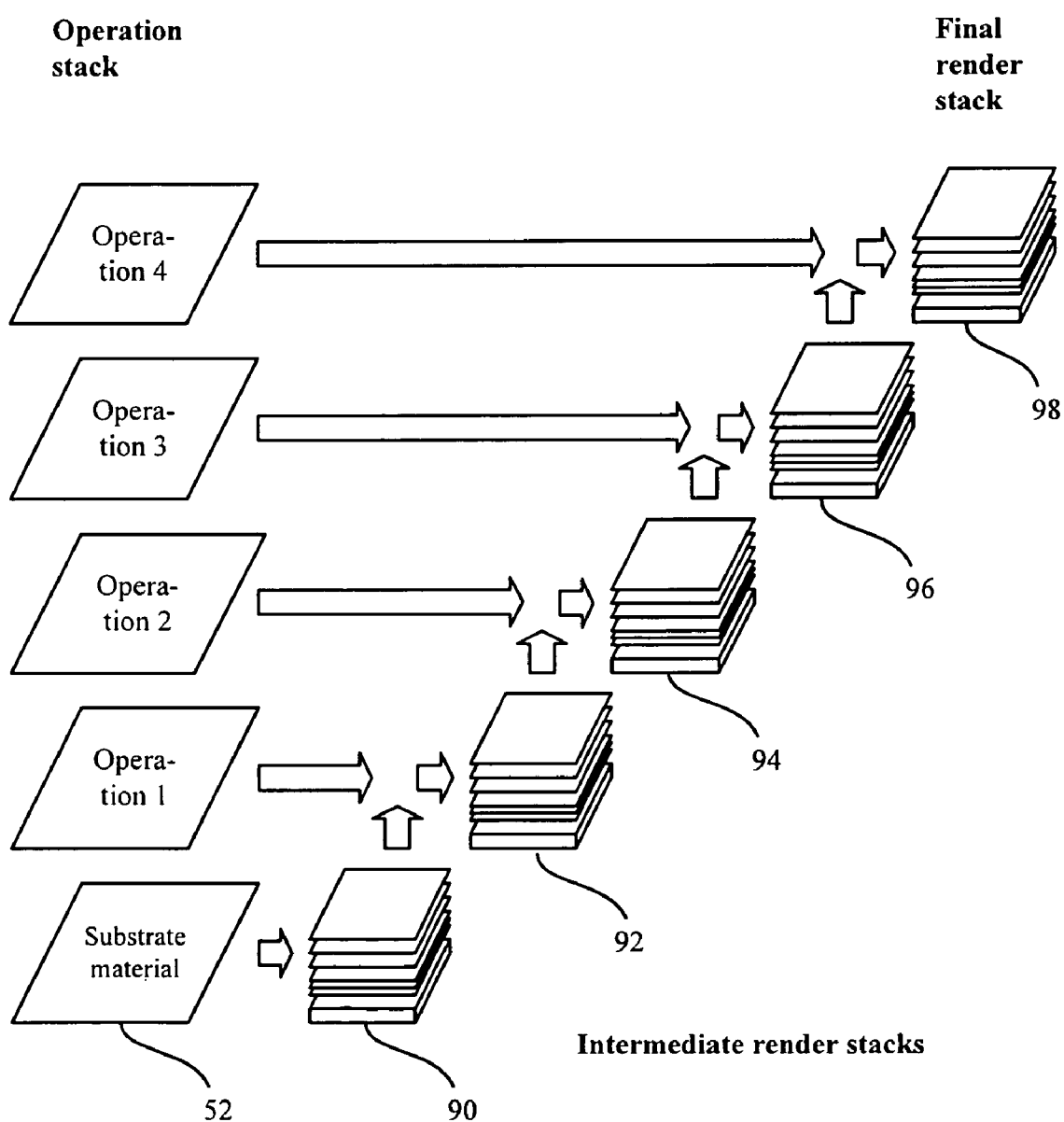
FIG. 4 schematically illustrates a sequence of binary combinations required to generate a render stack.

This is shown in greater detail in FIG. 4 where the properties of the base material 52 are looked up from a stored properties table in order to derive the red, green and blue color images, 70, 72 and 74 (FIG. 3) for the base material, together with a gloss image 76, a haze image 78 and a height image 80. Taken together this data represents a first intermediate render stack 90.

Once the first intermediate render stack 90 has been calculated then data relating to the application of operation 1 are retrieved. The stored data defining operation 1, along with its coverage image, color and control parameters if any, are used in a combination algorithm to transform each of the color, gloss and height map images of the first intermediate render stack 90 to derive a corresponding set of color, gloss, haze and height map images that form the second intermediate render stack 92. Examples of algorithms that are used for these transformations are explained below.

Then the definition data, coverage image, color and control parameters of operation 2 are retrieved and are combined with the intermediate render stack 92 to obtain a third intermediate render stack 94. Similarly the data relating to the third, fourth, and subsequent operations are retrieved in order such that fourth, fifth and subsequent render stacks 96, 98 and so on can be generated until the result of applying all of the operations in sequence have been considered and the final render stack has been generated.

Returning to FIG. 3, once the generation of the render stack 82 has been completed, this data, along with the render stacks for other faces, are then passed to the rendering engine 100 which produces the rendered view of the model, dependent also on the position and orientation of the model and viewpoint 102 and the selection of the environment 104. The selection of the environment may also be made from a drop down menu and movement and/or positioning of the model within the environment may be controlled by the user. The creation of virtual environments, the use of virtual environments to illuminate an object in a rendered 3D view, and the use of virtual environments to generate reflections in an object in a rendered 3D view are known by persons skilled in the art and do not require further description here.

General Algorithms for Calculation of Render Stack Images from Appearance Properties It is useful to exemplify transformation algorithms that may be used in the generation of the render stack for some common surface processing operations.

First we consider an algorithm that may be used for the surface's optical appearance properties of color (red, green and blue), gloss and haze.

Figure 5:
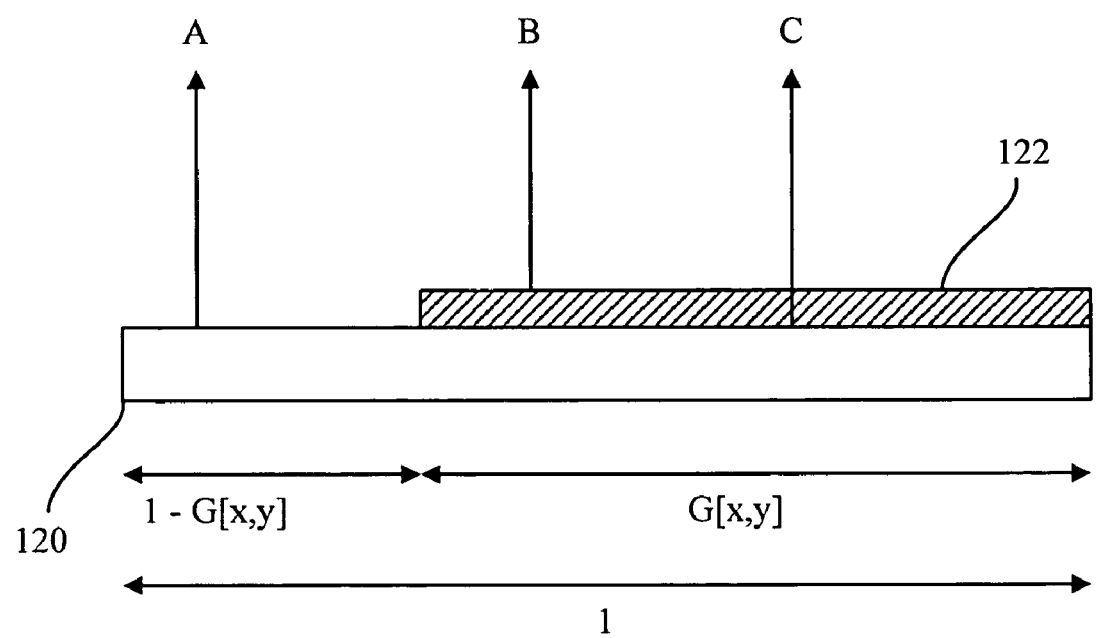
FIG. 5 shows the relationship for reflected light when a substrate has a coating applied to it.

Consider FIG. 5 where a substrate 120 is coated with a coating 122, such as an ink in a spot color printing operation.

At this stage it is useful to define some nomenclature.

v is a surface optical appearance property such as color (red, green or blue), gloss or haze.

Sv[x,y] is the value (on a normalized scale of 0 to 1) of pixel (x, y) for property v in image Sv of an intermediate or final render stack, before an operation is applied.

S'v[x,y] is the value (on a normalized scale of 0 to 1) of pixel (x, y) for property v in image S'v in a render stack after the operation has been applied.

G[x,y] is a point in the coverage image G which represents the degree of application (on a normalized scale of 0 to 1) at pixel (x, y) for the current operation. For a screen or lithographic printing operation this can be considered to be the dot size, where 1 indicates total surface coverage.

Pv is the opacity or merge factor. For a spot color print this is dependent on the thickness of a coating and properties of the material of the coating.

Ev is the extreme value of that property for the current operation. It is the value that the surface would have for the property v if the current operation covered the whole surface (G=1) and had complete opacity (P=1)

Note that Sv, Sv' and G are gray-scale images and Pv and Ev are constants (which for some operations may be modified by the user) for each property for the current operation. There is only one image G for each instance of an operation (not one for each property). It should be noted that if the user has selected a color image as the coverage image for a operation then the program typically transforms this to a gray-scale image, for example by calculating the mean intensity of the red, green and blue values for each pixel.

For a given point on a surface each of the surface properties red, green, blue and gloss are directly related to the intensity of light reflected by that point, under constant incident light conditions. For example the value of the red property is related to the intensity of the diffusely reflected light that is red in color, and similarly for green and blue. The gloss value at that point, on the other hand, is dependent on the intensity of all visible light that is specularly reflected by that part of the surface.

Under constant illumination conditions, therefore, the value of each of these surface properties can be defined in such a way that they are directly proportional to the intensity of reflected light measured in an appropriate way for each property. For simplicity the analysis below treats the surface property as being equal to the intensity of reflected light reflected measured in an appropriate way (if this is not done then a further constant is required in the equations, but the nature of the equations is unchanged).

When a small area of the surface is partially coated the average surface property can be found by summing the contributions to the reflected light of the uncoated and coated parts.

FIG. 5 shows a small area of the surface 120 which is partially covered by a coating 122 applied by an operation. This small area corresponds to a single pixel in each of the red, green, blue, gloss and haze images in the render stack. The value of each property v of the surface at the pixel [x,y], before the operation is applied, is Sv[x,y]. After the application of the operation the resulting value S'v[x,y] of a property at that pixel can be calculated as the sum of:

a) the contribution of light reflected by the part of the surface that has not been covered by the coating of the current operation $$=Sv[x,y].(1-G[x,y]) \qquad \text{Equation 1}$$

b) the contribution of light reflected by the coating $$=Pv.Ev.G[x,y] \qquad \text{Equation 2}$$

c) the contribution of light reflected by the surface that has passed through the coating $$=(1-Pv).Sv[x,y].G[x,y] \qquad \text{Equation 3}$$

$$S'v[x, y] = A + B + C \qquad \text{Equation 4}$$
$$= \{Sv[x, y] \cdot (1 - G[x, y])\} +$$
$$\{Pv \cdot Ev \cdot G[x, y]\} +$$
$$\{(1 - Pv) \cdot Sv[x, y] \cdot G[x, y]\}$$
$$= Sv[x, y] - Sv[x, y] \cdot G[x, y] +$$
$$Pv \cdot Ev \cdot G[x, y] + Sv[x, y] \cdot G[x, y] -$$
$$Pv \cdot Sv[x, y] \cdot G[x, y]$$
$$= Sv[x, y] + Pv \cdot Ev \cdot G[x, y] -$$
$$Pv \cdot Sv[x, y] \cdot G[x, y]$$

Equation 4 can be expressed in several other forms:

$$=Sv[x,y]+Pv.G[x,y].(Ev-Sv[x,y])$$

or $$=Sv[x,y].(1-Pv.G[x,y])+Ev.Pv.G[x,y] \qquad \text{Equation 5}$$

This latter form of the equation illustrates that the value of the average value S'v[x,y] of the appearance property v for the partially coated pixel is a weighted average of the value Sv[x,y] on the uncoated surface and the extreme value Ev for the coating, with Pv.G[x,y] as a weighting factor.

There are a number of special cases which can be considered to illustrate the validity of this analysis.

Where there is 100% coverage of a fully opaque operation, such as a spot color print, then $$\text{Coverage } G[x, y] = 1.0 \qquad \text{Equation 6}$$
$$\text{Fully opaque } Pv =$$
$$1.0 (\text{at least for red, green and blue}) \text{ so}$$
$$S'v[x, y] = Sv[x, y] + Ev - Sv[x, y]$$
$$= Ev$$

or, in other words, the color of the surface changes completely to the color of the process color, whatever the color of the underlying surface that it is printed on.

Another special case is the 100% coverage of a partially opaque operation.

$$\text{Coverage } G[x, y] = 1.0 \text{ so} \qquad \text{Equation 7}$$
$$S'v[x, y] = Sv[x, y] + Pv \cdot Ev - Pv \cdot Sv[x, y]$$
$$= Sv[x, y] \cdot (1 - Pv) + Pv \cdot Ev$$

which is a weighted average of the previous intermediate render stack value and the extreme value, with the weighting factor given by the opacity.

Another special case is partial coverage of an opaque operation.

Opacity $Pv = 1.0$ so  Equation 8

$$S'v[x, y] = Sv[x, y] + Ev \cdot G[x, y] - Sv[x, y] \cdot G[x, y]$$
$$= Sv[x, y] \cdot (1 - G[x, y]) + Ev \cdot G[x, y]$$

which is a weighted average of the previous stack value and the extreme value, with the weighting factor given by the coverage value.

A further interesting case is a lamination with a partially transparent film which reduces the lightness and/or dims colors. Here once again the coverage is assumed to be total, thus Coverage $G[x,y]=1.0$  Equation 9 then for R, G and B:

extreme value $Ev=0$ (assuming these coatings do not add their own color to the appearance)

opacity $Pv = 0.1$, say so  Equation 10

$$S'v[x, y] = Sv[x, y] - 0.1 \cdot Sv[x, y]$$
$$= 0.9 \cdot Sv[x, y]$$

Then R, G and B values are all reduced by 10%, so the lightness of the color is reduced by 10%.

Some operations do not affect certain properties. This can be modeled by setting the opacity to zero $Pv=0$ to give $S'v[x,y]=Sv[x,y]$.

Figure 6:
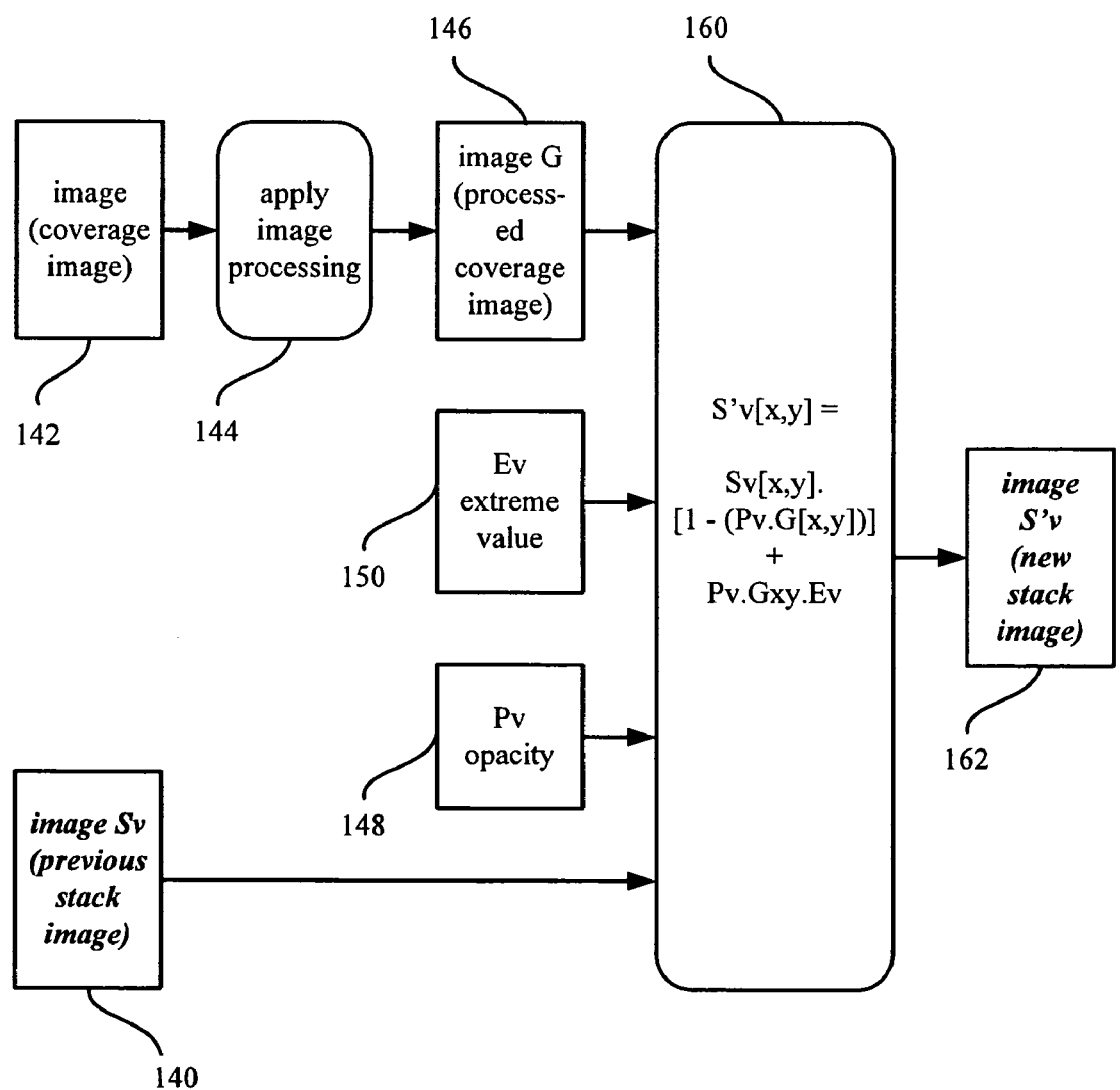
FIG. 6 schematically illustrates a full appearance parameter algorithm.

These processing steps are illustrated in FIG. 6. Here the intermediate render stack images from previous operations Sv is designated 140. The coverage image for this operation is labeled 142.

For certain operations the coverage image may be processed at step 144 to create the processed coverage image 146. The nature of the image processing, if any, is predefined for each property of each operation type. For example, the coverage image may be dilated slightly, to take account of the slight spread of ink as it is partially absorbed by a paper substrate. Furthermore noise may be added to the coverage to mimic imperfections in the physical printing operation.

The processed coverage image 146 together with coefficients for opacity (Pv) 148 and the extreme value Ev 150 are passed to a processing engine 160 which combines the processed coverage image 146 with each image of the intermediate render stack images Sv 140 using the linear interpolation algorithms described above to generate a new intermediate render stack images S'v 162.

Four Color Printing

In many common printing processes a common color printing process is process color printing, typically applied as a 4-color process CMYK printing (where these four letters stand for the colors of the four inks that are typically used: C for cyan, M for magenta, Y for yellow and K for black). The black ink is required as in the real-world printing operation application of 100% cyan, magenta and yellow inks does not produce a perfect black color, so the black ink is used to correct this effect.

In reality CMYK printing is a composite operation, consisting of the sequential application of the four colored inks. However in the transformation algorithm used in the preferred embodiment of the invention it is advantageous to treat process color printing as a single composite operation, using a simplified algorithm that is derived below.

CMYK printing can be modeled with just 3 ideal inks, cyan, magenta and yellow—the black is not needed for modeling the effects on the red, green and blue properties of the surface as, with "ideal" inks, 100% cyan, magenta and yellow give a perfect black.

Firstly one can analyze the CMY print as 3 separate operation elements—printing with cyan, with magenta and then with yellow. The subscripts r, g, and b are used to indicate the properties red, green and blue respectively.

Cyan print—(an ideal ink that, with 100% coverage, absorbs all red light and transmits all blue and green light). For the red property:

extreme value $Er = 0$ and  Equation 11 opacity $Pr = 1.0$ as all the red light is absorbed so $$S'r[x, y] = Sr[x, y] - Sr[x, y] \cdot Gcyan[x, y]$$
$$= Sr[x, y](1 - Gcyan[x, y])$$

However it is well known that for idealized CMY printing,

Cyan=1−Red, or, in the terminology used within this document, $Gcyan[x,y]=1-Gr[x,y]$ so $S'r[x,y]=Sr[x,y].Gr[x,y]$  Equation 12 for green and blue $Pv=0$ so $S'g[x,y]=Sg[x,y]$ $S'b[x,y]=Sb[x,y]$

In other words, the green and blue colors on the surface are unaffected by the cyan ink, as it transmits all the green and blue light.

Similarly for the magenta print:

$S'r[x,y]=Sr[x,y]$ $S'g[x,y]=Sg[x,y].Gg[x,y]$ $S'b[x,y]=Sb[x,y]$

Here, the red and blue are unaffected.

Also for the yellow print:

$S'r[x,y]=Sr[x,y]$ $S'g[x,y]=Sg[x,y]$ $S'b[x,y]=Sb[x,y].Gb[x,y]$

As each of the three inks/print operation elements (cyan, magenta and yellow) affect just one color property, it does not matter which order the inks are applied in the modeling process.

The sequence of three prints can therefore be treated as a single composite operation with:

$$S'r[x,y]=Sr[x,y].Gr[x,y]$$

$$S'g[x,y]=Sg[x,y].Gg[x,y]$$

$$S'b[x,y]=Sb[x,y].Gb[x,y] \qquad \text{Equations 13}$$

It is reasonable to expect that these equations will give the correct result when an image, which has been designed to be printed on a white substrate, is actually printed onto a non-white surface, such as yellow paper.

Figure 7:
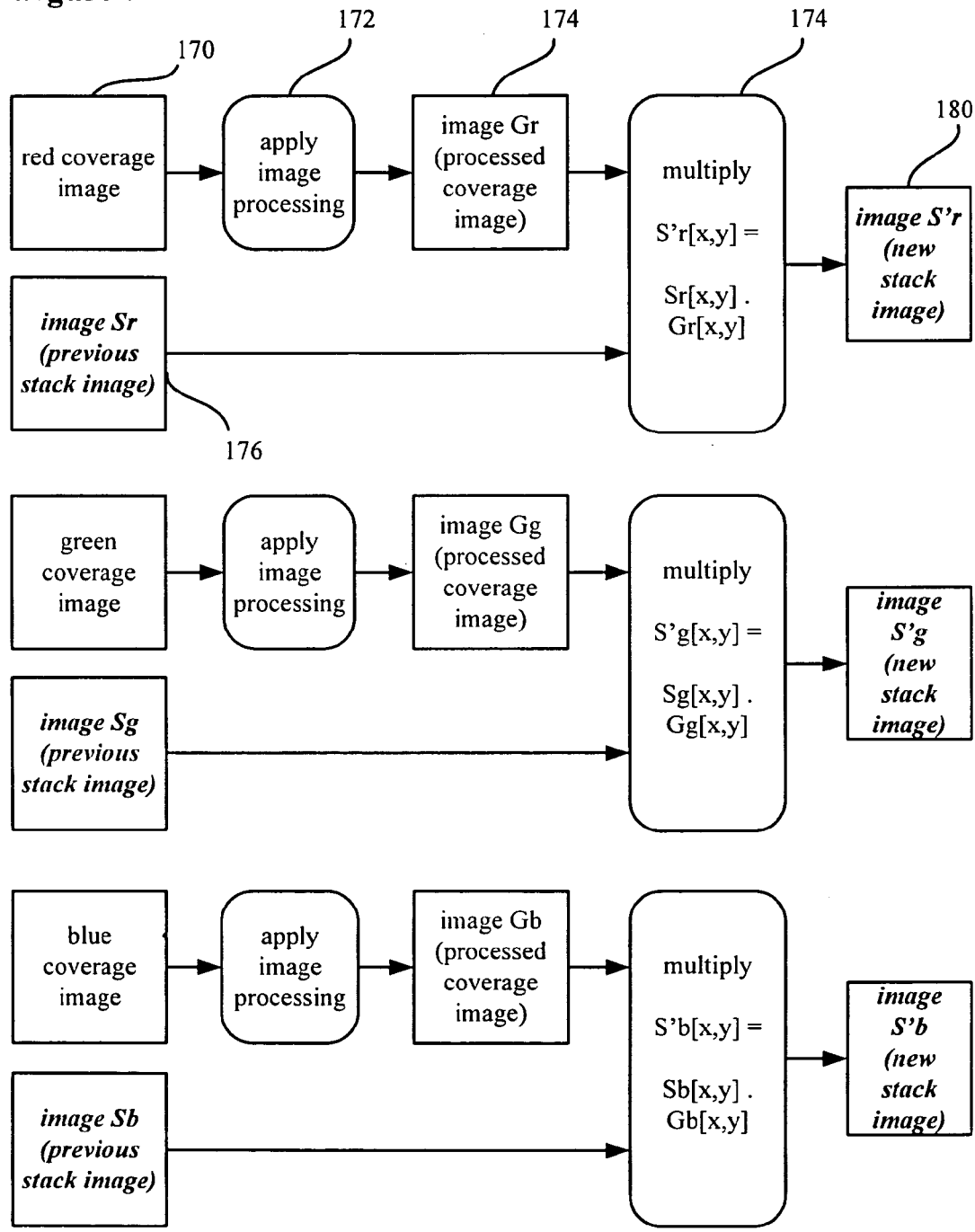
FIG. 7 schematically illustrates a processing algorithm for calculating the effects of a CMYK print operation.

This simplified algorithm for modeling a CMYK printing operation is depicted in FIG. 7. For simplicity we will only consider the operations performed in respect of the red image. The new red coverage image is introduced at step 170 and is processed at step 172 to generate a processed coverage image Gr 174 which sets out the coverage of red pigment Gr[x,y].

The pre-existing intermediate render stack image for the red image is represented as image 176 and these are multiplied together at step 178 such that $$S'r[x,y]=Sr[x,y].Gr[x,y] \qquad \text{Equation 14}$$

where the new image is to completely overlie the preceding image. This new image is stored at step 180.

The effect on gloss, haze and relief of process color printing should also be considered. They can be quite accurately represented if the effects of the three separate CMY ink applications are separately modeled however this gives rise to a more lengthy calculation:

e.g. for gloss, after the cyan print:

$$S'gloss[x,y]=Sgloss[x,y]+Pcyangloss.Ecyangloss.Gcyan[x,y]-Pcyangloss.Sgloss[x,y].Gcyan[x,y] \qquad \text{Equation 15}$$

then after magenta:

$$S''gloss[x,y]=S'gloss[x,y]+Pmagentagloss.Emagentagloss.Gmagentata[x,y]-Pmagentagloss.S'gloss[x,y].Gmagenta[x,y] \qquad \text{Equation 16}$$

and finally after yellow:

$$S'''gloss[x,y]=S''gloss[x,y]+Pmagentagloss.Emagentagloss.Gyellow[x,y]-Pmagentagloss.S''gloss[x,y].Gyellow[x,y] \qquad \text{Equation 17}$$

This full algorithm would be time-consuming to calculate and requires estimates of the values of P and E for each of the three ink colors. To be fully accurate it should also include modeling of the black ink application which is used in the real-world CMYK print operation, and this would complicate the calculations yet further.

However in reality CMYK process inks are commonly printed onto an absorbent substrate surface, such as a paper, so that the inks are absorbed into the top of the surface of the substrate and therefore do not significantly change the gloss, haze or height of the surface. Therefore in this simplified algorithm to model the CMY operation the effects on gloss, haze and height are typically omitted.

Surface Relief

Surface height, or relief, has different algorithms to the optical appearance properties (red, green, blue, gloss and haze). It is generally additive in nature.

Coating Operations

When a coating is applied to the surface, the height of each point on the surface is increased by the thickness of the coating.

For the surface height Eh is the maximum thickness of the coating that is applied, while G[x,y] is the coverage image, which has a value of 1 in areas where the coating is applied with the maximum thickness Eh.

Figure 8:
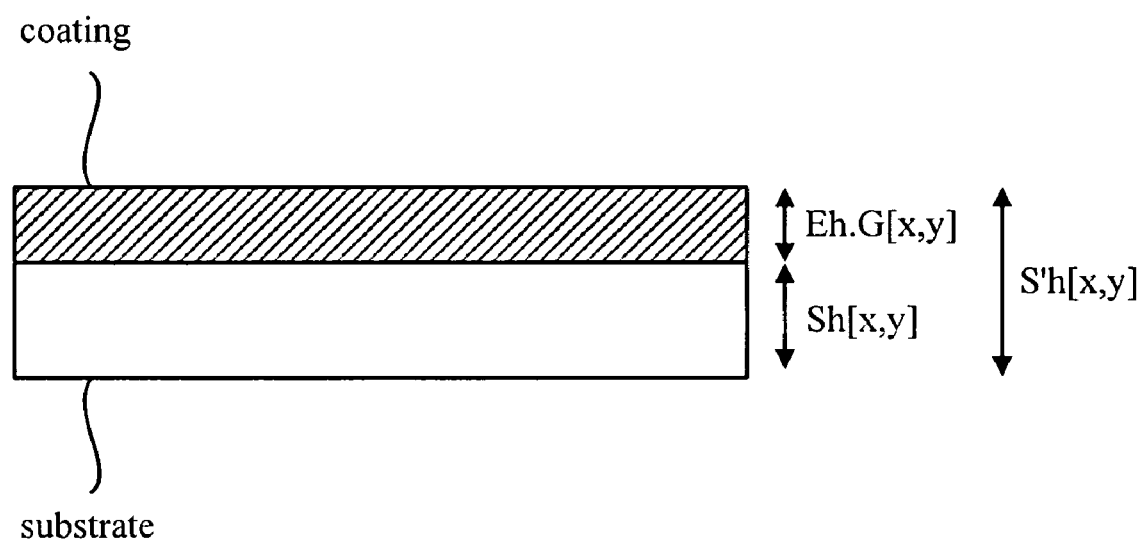
FIG. 8 shows the effect of applying a coating operation to a substrate, causing a height change.

As illustrated in FIG. 8, the average new height at pixel [x,y], after the application of the coating with mask image G, can be calculated by:

$$S'h[x,y]=Sh[x,y]+(Eh.G[x,y]) \qquad \text{Equation 18}$$

This does not take into account the very localized variations in height at pixel level where a coating dot is printed or not printed, but rather gives the average height of the surface at any particular location after application of the coating.

Mechanical Operations

When a mechanical operation is carried out, such as embossing/debossing of paper or polishing of the surface of a tile, the level of any point on the surface can go down as well as up.

It should be noted that for the mechanical operations the image G no longer represents the "coverage" of the operation, but is rather treated as a direct indication of the effect of that operation on the height of each pixel of the height image of the render stack.

A decrease in height can be implemented by having a negative value of the extreme value Eh, applied to the surface using the coverage image G which has only positive values.

For example, an embossing operation can raise parts of the surface and a debossing operation can lower areas. In printed products most coating operations cause relatively small relief changes and the coatings are fairly hard. A subsequent embossing operation is therefore unlikely to flatten out these earlier relief changes.

It therefore seems reasonable to model embossing/debossing using a simple additive/subtraction algorithm:

Embossing: $S'h[x,y]=Sh[x,y]+(Eh.G[x,y]) \qquad$ Equation 19 i.e. the same as the coating relief algorithm given above

Debossing: $S'h[x,y]=Sh[x,y]-(Eh.G[x,y]) \qquad$ Equation 20

In an embodiment of the present invention these algorithms are represented by the same algorithm, S'h[x,y]=Sh[x,y]+(Eh.G[x,y]), but Eh is negative for the debossing operation.

For both embossing and debossing G[x,y] should have a pixel value of 0 where no effect is required and a positive value where the surface height is affected.

Embossing operations typically affect not just the surface that they are applied to, but also the reverse face of the sheet that is embossed. Depending on the shape of the object this can be modeled automatically or manually. For example when an emboss operation is applied to the front of a sheet of paper a deboss operation should be applied to the back of the sheet using an operation image that is reflected about a vertical axis. This operation should take into account factors like the thickness of the paper or card being used, which reduce the height of the deboss.

Figure 9:
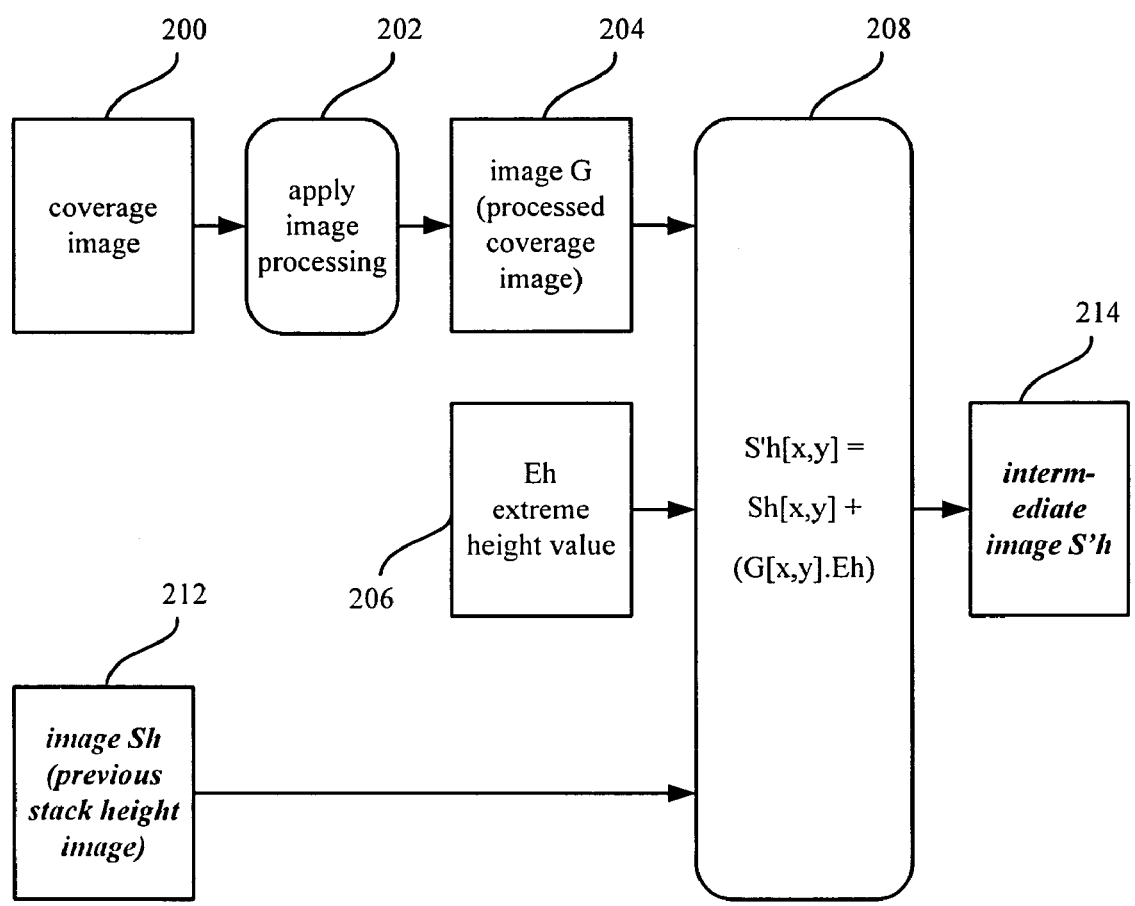
FIG. 9 schematically illustrates the steps performed in a relief algorithm.

An algorithm for dealing with changes in relief of a surface is schematically illustrated in FIG. 9. The algorithm commences at step 200 where the coverage image to be used for the current printing processing operation is retrieved from memory. Control then passes to step 202 where image processing operations, which are again pre-defined for each surface processing operation, are applied so as to derive a processed coverage image G at step 204.

The processed coverage image G is then combined with the height image Sh 212 of the previous render stack using the algorithm of equation 19 at step 208 to calculate the new render stack height image S'h 214.

Graphical User Interface

Figure 10:
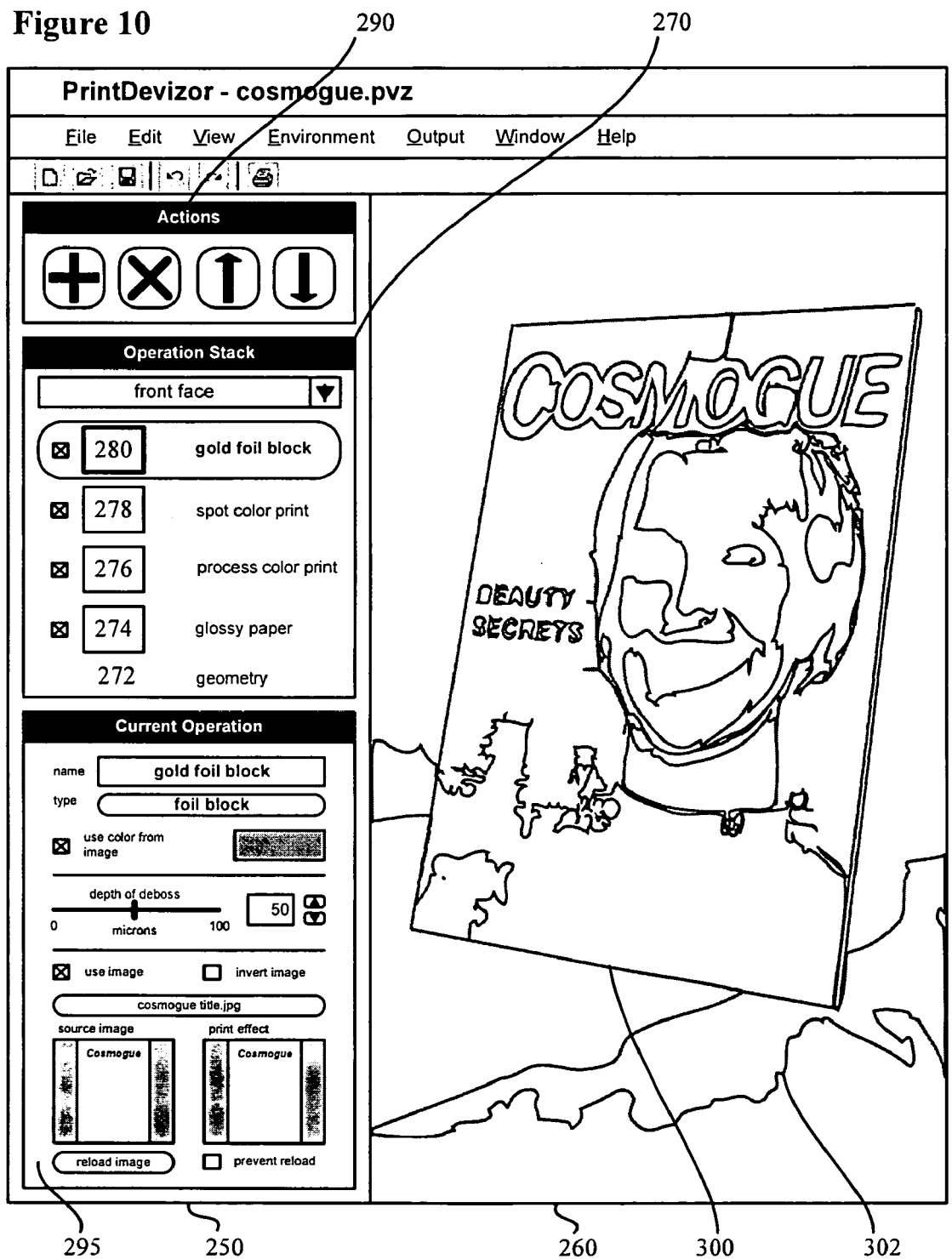
FIG. 10 schematically illustrates a user interface of an embodiment of the present invention.

FIG. 10 schematically illustrates a user interface for an embodiment of the present invention. The interface is divided into two regions, generally labeled 250 and 260, with the image region 250 defining an input panel, and the region 260 showing a representation of the product within a virtual environment. The input region displays an operation stack 270 which lists the various operations which are to be applied to the selected face or faces. The operation stack also shows and gives access to the geometry of the model and type and properties of the substrate material.

Thus, in the example shown in FIG. 10, the lower element 272 in the operation stack represents the geometry of the which is to be modeled. The next element 274 defines the substrate material which in this case has been selected to be "glossy paper".

The next operation up, 276, indicates that a process color print operation is applied. A thumbnail view of the color image to be applied is also shown in the operation stack in order to make it easier for the designer to appreciate and check which image is being used for this process. The next operation to be applied, process 278, is a spot color print, and again the coverage image is shown as a thumbnail. The final operation in the exemplary operation stack shown here is a gold foil block print at step 280 and its coverage image is also shown as a thumbnail.

The geometry, substrate material and surface processing operations are shown in a stacked representation. New operations can be added to or inserted in the operation stack and each existing operation can be deleted from the stack or promoted up or demoted down the stack using the action icons generally indicated 290.

The user interface also allows the designer to modify certain properties of each operation. Thus, the user may select which existing operation is to be treated as the current operation by selecting that operation in the operation stack. The properties of the current operation are then displayed in a current operation area 295. In the example shown in FIG. 10 the gold foil block operation is the current operation and in the current operation area the user can change the text name used for the operation, change the type of the operation, set the color used for the operation, control the depth of deboss (as that is an appropriate parameter to vary for this operation type) which is created during the application of the foil block and change the coverage image file that is used for this operation.

The output portion 260 shows a 3D-rendered view of the current design of the model. The user, through use of the graphical user interface, can instruct the model, in this example a magazine 300, to be rotated within the environment 302. Similarly the user can move the viewpoint from which the rendered view is created or move the viewpoint towards or away from the model to give a zooming effect, in order to see how the appearance of the object changes. The user can also move the model or viewpoint up and down and side to side to translate the model within the view region 260. These model manipulations are preferably carried out using a mouse. For example the user can rotate the model leftwards by left-clicking on the model and dragging the mouse leftwards.

Preferably the view images are rendered in real-time, that is to say they are generated and displayed at least 15 times per second, to give the impression of smooth movement and produce the illusion that a real object is being viewed.

Preferably the user can select a different environment 302 from a list of stored environments, and can then see the appearance of the model as it would appear in that environment.

Output Options

In an embodiment of the invention, the user can cause the program to output views of the model is several different formats.

Most simply the currently displayed view can be output to an image file of a selected standard file type and at a resolution chosen by the user. Alternatively an animation sequence can be generated, for example showing the object rotating.

A third output option is to generate a file in a format that allows the model to be viewed interactively with a standard viewer software. One example of such a format is "Apple QuickTime VR", which can be viewed using the "Apple QuickTime Player".

These output options allow the user to produce data files which can be passed to others and then viewed by them with standard software so that they can gain an appreciation of the design.

It is thus possible to provide a computer implemented design aid which enables a user to design an object and to see the appearance of that object as a result of applying a sequence of surface processing steps to the object.

The invention claimed is:

1. A computer implemented method of generating a visual representation of a printed object where a surface of the object is, at least in part, subjected to at least one printing operation, the method comprising the steps of:
    a) defining a substrate material for the object;
    b) an input step of receiving a sequence of at least one printing operation type, where each printing operation type identifies a corresponding physical printing operation;
    c) retrieving stored data defining the effects of each printing operation on the appearance characteristics of a computer model surface such that the effects mimic the real-world effects of the corresponding physical printing operation on the appearance of a physical surface;
    d) modeling the result of applying the printing operations in sequence to part or all of the surface of a computer model and modeling their interaction in terms of colour and at least one other surface appearance characteristic; and
    e) outputting a result of the modeling to produce a visual representation of the modeled object.

2. A method as claimed in claim 1, in which the input step allows the user to perform at least one item from a list comprising:
    a) defining the shape of the object;
    b) defining a face of the object to which printing steps operations are to be applied;
    c) selecting from a predefined list a printing operation to be applied;
    d) defining colors to be associated with a printing operation; and
    e) adjusting parameters associated with a printing operation.

3. A method as claimed in claim 2, wherein the user can add further printing operations.

4. A method as claimed in claim 2, wherein the user can change the order in which printing operations are applied to a surface, and the effect produced by applying the printing operations in the order is calculated.

5. A method as claimed in claim 1 in which the surface appearance characteristics comprise color, gloss and haze.

6. A method as claimed in claim 5, in which the surface appearance characteristics further include surface height variations.

7. A method as claimed in claim 1, in which the user can change the orientation of the computer model in the visual representation.

8. A method as claimed in claim 7, in which the method is interactive, thereby enabling the user to see the effect of rotating the model.

9. A method as claimed in claim 1, in which the input step further comprises selecting a virtual environment to view the model in.

10. A method as claimed in claim 9, in which the light distribution over the selected environment is taken into account during the rendering of the model's surfaces to generate views of the model which simulate the appearance of the corresponding object as it would appear in the corresponding physical environment.

11. A method as claimed in claim 1, wherein the data defining the effects of each printing operation defined in the input sequence is retrieved from a data store.

12. A method as claimed in claim 1, for generating a visual representation of a printed paper or card object.

13. A method as claimed in claim 1, for generating a visual representation of a ceramic tile.

14. A computer program product for causing a computer to implement the method claimed in claim 1.

15. A method as claimed in claim 1, in which:
  a) a 2-dimensional image acts as a coverage image for at least one of the printing operations; and
  b) the result of the modeling is a stack of 2-dimensional images, each of which represents a surface appearance characteristic of the printed object.

* * * * *

UNITED STATES PATENT AND TRADEMARK OFFICE
CERTIFICATE OF CORRECTION

PATENT NO. : 7,154,505 B2 Page 1 of 1
APPLICATION NO. : 10/985390
DATED : December 26, 2006
INVENTOR(S) : Martin Arthur Coulthard It is certified that error appears in the above-identified patent and that said Letters Patent is hereby corrected as shown below:

Column 14

Claim 2, line 56, delete "steps".

Signed and Sealed this

Twentieth Day of March, 2007

JON W. DUDAS
*Director of the United States Patent and Trademark Office*